Figure 1:
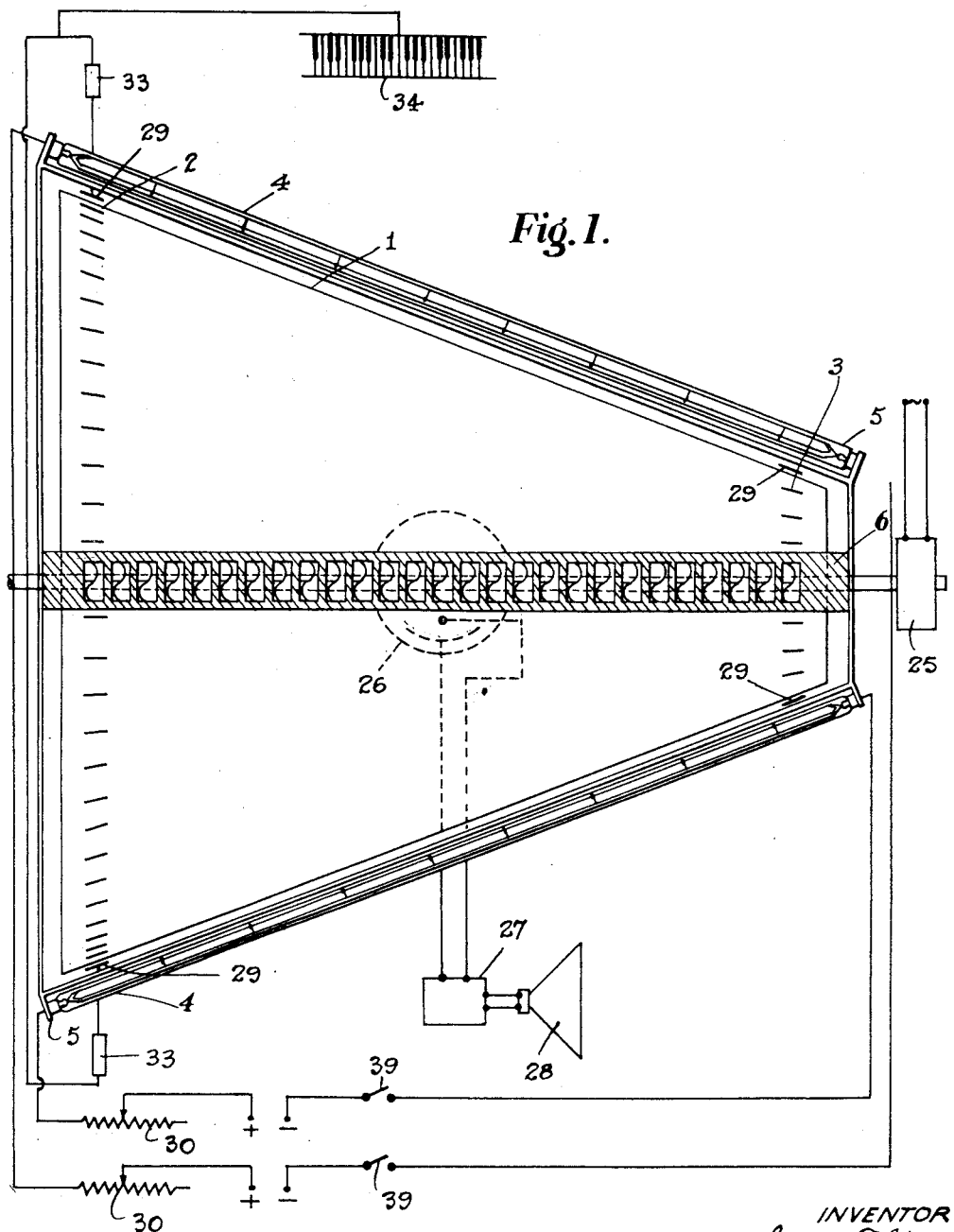

Jan. 1, 1935.  G. T. WINCH  1,986,547
MUSICAL INSTRUMENT
Filed Aug. 2, 1932   2 Sheets-Sheet 1

INVENTOR
Gordon T. Winch
BY
N. H. Lockwood
ATTORNEY

Jan. 1, 1935.  G. T. WINCH  1,986,547
MUSICAL INSTRUMENT
Filed Aug. 2, 1932  2 Sheets-Sheet 2
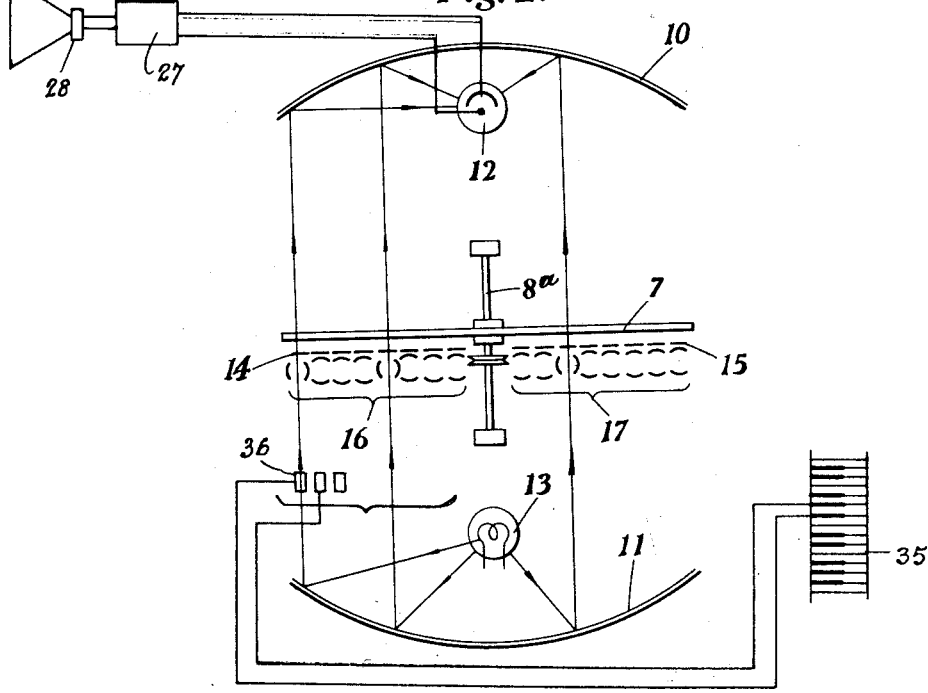
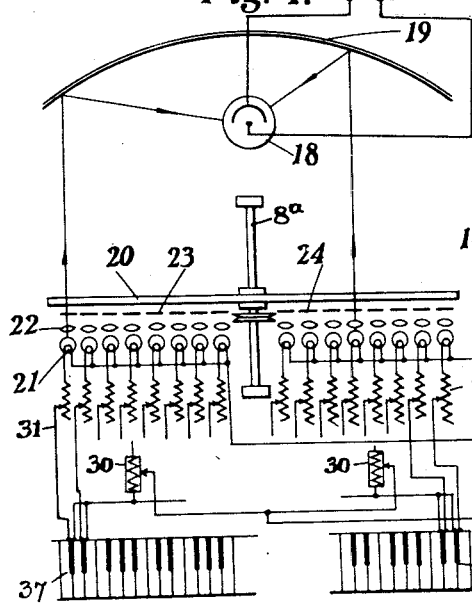
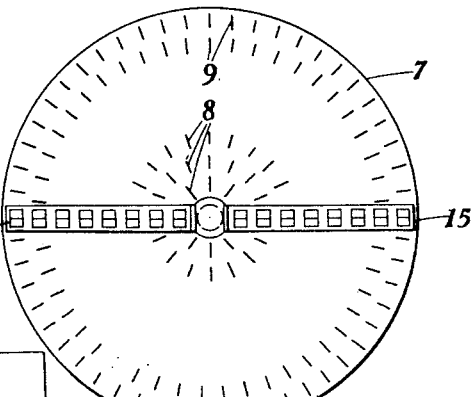
INVENTOR
Gordon T. Winch
BY
N. H. Lockwood
ATTORNEY Patented Jan. 1, 1935

1,986,547

UNITED STATES PATENT OFFICE 1,986,547

MUSICAL INSTRUMENT

Gordon Thomas Winch, East Sheen, England, assignor to The General Electric Company Limited, London, England Application August 2, 1932, Serial No. 627,231
In Great Britain August 4, 1931

9 Claims. (Cl. 84—1)

This invention refers to musical instruments in which sound is produced by means of light-sensitive electrical devices. A light-sensitive electrical device will hereinafter be termed a photoelectric cell or simply a cell; but a limitation to one particular form of such devices is not implied.

In all such instruments the sound is produced by varying cyclically the light falling on the cells; the cyclical variation is produced by the relative motion of two members the relative position of which determines the proportion of the light from a constant source that can reach the cell. But for the purpose of this specification it is important to distinguish between two types of instrument of which a talking film reproducer and the instrument designed by Hugoniot (French Patent 550,370) may be taken respectively as examples. (In this latter equally spaced radial slits in a rotating disc pass over an aperture the form of which determines the quality of the sound). The difference in principle between them appears when the problem of changing the quality of the sound without changing its pitch is raised. In an instrument of the first type the change in quality would be produced by changing the film, in the second by changing the aperture over which the slits pass. In each case the quality of the sound is determined by one of the relatively moving members and not by the other; and therefore, adopting a terminology suggested by the second type, we can always speak of the member that determines the quality as the aperture and of the other member as the slit. Now the difference between the types important for our purpose is that the cyclical elements, that leads to a repetition of the variation of the light, are associated in the first type with the aperture and in the second type with the slit. In the first type many similar apertures pass in regular sequence over a single slit; in the second many slits pass in regular sequence over a single aperture. This invention relates wholly to instruments of the second type, and has no reference to instruments of the first type. It may be observed that a type is conceivable in which a single slit, carried on a rotating member, passes in regular sequence over a single aperture, represented by a non-cyclical variation of opacity round its path; but such a type is not likely to be of practical importance and is excluded from this invention.

Although the type of instrument to which the invention refers is already known, its great advantage over the first type does not seem to have been realized. This is that many dissimilar apertures can be easily associated with a single series of slits and a variation of the quality of the sound without variation of its pitch is thus easily effected. It is therefore relatively easy with an instrument of this type to produce a photoelectric organ, possessing like a mechanical organ, several "stops" giving sounds within the same range of pitch but different quality.

According to the invention in musical instruments of the type described notes of the same pitch but different quality are produced by associating the same series of slits with different apertures. The different apertures are brought into operation by directing a beam of light so as to pass through them to the cell when a slit passes over them.

There will now be described, by way of example with reference to the accompanying diagrammatic drawings three constructions of a musical instrument in accordance with the invention having the general properties of an organ, Figure 1 of which shows an arrangement in which the slits are formed in a drum, Figures 2 and 3 elevation and part plan of an arrangement in which the slits are formed in a disc, Figure 4 shows an alternative arrangement in which the slits are again formed in a disc. It is to be understood that many of the parts described are known per se; in particular the construction in which the slits are formed in a drum, with the cell inside and the sources outside, is already known, and so is that in which parabolic mirrors are placed on either side of the disc with the cell and source at their foci, whilst it is also known photographically to produce and reproduce wave records.

In the instrument shown in Figure 1 of the drawings, a conical drum 1 is pierced with several rows of slits; the slits are parallel to the axis and the plane of each row perpendicular to the axis. Each row contains a different number of slits, the slits in each row being equidistant from each other. Two rows 2, 3 only are shown on the drawings, one at either end of the drum. The drum is driven at constant speed about its axis by the motor 25; the slits in different rows pass a given point at different frequencies and therefore excite notes of different pitch.

The interior of the drum contains a photoelectric cell 26, arranged so that it receives approximately the same amount of light from all slits, if all slits are equally illuminated and connected to an amplifier 27 feeding loud speaking devices 28, one only of which is shown. To aid the attainment of the equal illumination condition the interior of the drum is coated with a white diffusing material. On the exterior of the drum are arranged several approximately linear sources of light two of which are shown at 4; each source corresponds to a different stop and can be illuminated by closure of a stop switch 39. Between each source and the drum, and extending across each row of slits is placed a member having therein a row of apertures three of which members are shown, two indicated at 5 and one in plan section at 6, the form of which apertures is the same for each source, but different for different sources. Since the form of the aperture determines the quality of the sound, the sounds excited by any one source are of the same quality, but of pitch differing with the numbers of slits in a row. Associated with each aperture and shown diagrammatically on the drawings at 29 is a shutter operated through electro-magnet means 33 from the keyboard 34 of the instrument; when the shutter is opened light is allowed to pass through the aperture and the row of slits opposite on to the photocell, and the note sounds, when it is closed the note is silent. In virtue of the general principle of the superposition of oscillations, if several shutters are open at the same time and various light sources are in operation, the combination of the corresponding notes is heard. The shutters may be of any suitable type.

It is assumed in this description that the waveform of the vibration corresponding to the note of a given stop is the same whatever the pitch. This assumption may not be strictly true. If it is not true, the apertures under each source will not have exactly the same form, but the form will vary slightly with the pitch. But it will still be generally true that the forms of the apertures under a single source, corresponding to a single stop, will resemble each other more closely than they resemble the form of apertures under different sources, corresponding to different stops.

In order that the use of the instrument should be similar to that of existing organs, it is preferable that all shutters corresponding to notes of the same pitch should be coupled, so that they open and close together. This can readily be effected by using electromagnets to move the shutters and placing all the electromagnets operating shutters of the same pitch in the same electrical circuit. The various stops are then brought into operation by lighting the corresponding sources by switches 39. If the current to the source (assumed to be an electric incandescent lamp) is controlled by a rheostat 30, the volume of each stop can be controlled and the effect of the swell-box of an organ simulated; but it is to be noted that the swell-box effect can be applied independently to each stop.

In the construction shown in Figure 2 the conical drum is replaced by an opaque disc 7 (a plan of which is shown in Figure 3), having a number of circular rows of light transmitting slits cut therein, the long axis of each slit being along a radius of the disc 7. Rows of such slits are shown at 8, 9 on Figure 3. The disc 7 is mounted on a shaft 8a which can be driven at a constant speed in any suitable manner for example by a synchronous motor. On each side of the disc 7 is arranged a parabolic mirror 10, 11. The upper mirror 10 has arranged at its focus a photoelectric cell 12 connected to an amplifier 27 and loud speaker device or devices 28. The lower mirror 11 has arranged at its focus an electric lamp with a small point-like filament 13. Between the disc and the lamp are arranged a number of radial rows of members provided with apertures, each of the desired form; two such rows are shown at 14 and 15; a set of electrically operated shutters being associated with each set of apertures. The shutters associated with the aperture rows 14 and 15 are shown at 16 and 17 respectively, the first, fifth and eleventh from the left being shown in the open position. In this example also the fundamental principle of the operation is the same, the shutters being operated from the keyboard 35 of the instrument through electro-magnet means 36; the number of slits in the rows being different, the fundamental pitches produced from each are also different. A number of selecting switches are provided for the stop control, which switches control different sets of shutters.

In the arrangement shown in Figure 4, the shutters necessary in the arrangement of Figure 2 are dispensed with as is the single source of light. As before a photocell 18 is arranged at the focus of a parabolic mirror 19 which receives light coming through any slits in the rows of slits on or in the disc 20 which is rotated, in any convenient manner, at a constant speed. The photocell 18 is connected to an amplifier 27 and a loud speaker device or devices 28. The sources of light are constituted by rows of small incandescent electric lamps one of which rows is shown at 21, there being one lamp in each stop associated with each aperture. The light from each lamp is focussed by a small short focus lens, one set of which is shown at 22, and between the said lenses and the rotating disc 20 are the sets of apertures, two of which are shown at 23, 24. In this arrangement, the actual playing of a note is caused by the illumination of the lamp associated with the row of slits giving the desired pitch. The stop controls can be constituted by selecting switches determining which lamps can be illuminated by depression of a key on the associated keyboard 37. The keyboard 37 is shown diagrammatically as a two manual keyboard. An advantage of the arrangement shown in Figure 4 over that shown in Figure 2 is that volume control can separately be applied if desired, by controlling the current flowing through any of the lamps by rheostats 31. The volume of each stop can be controlled and the effect of the swell-box of an organ simulated, by common "stop" means 30, which may be constituted by a small generator arranged to give a negative boost (i. e. to buck) the normal lamp supply. Alternatively volume control may be effected by control of the amplifier 27. Similarly the crescendo pedal of the organ, which brings stops successively into operation, is replaced by a series of switches such as 32 controlling the sources corresponding to the different stops. Again composition pistons are replaced by electrically connected switches such as shown at 38, which light the sources for two or more stops simultaneously. It will be seen therefore that a musical instrument according to the invention is simpler in operation than existing mechanical organs and offers opportunities for more delicate control.

In both the arrangements shown in Figures 2 and 4 the disc can for example be made of glass having on one side a coating of an opaque material in which are scratched the "slits". Preferably the slits are formed by a photographic method.

The form of the apertures in every arrangement described herein is determined by investigation of the wave form of the sounds that it is desired to produce. The principle whereby the form of the aperture is connected with the wave form of the sound will be obvious to those skilled in the art; but the final adjustment of the form of the aperture will usually have to be made by trial and error. When once the form has been determined, apertures of the same form may conveniently be made by photographic reproduction. For this purpose the aperture may consist of a photographic plate, part of which is darkened and the remainder light; similar apertures can then be produced by contact printing.

I claim:

1. A musical instrument comprising in combination a rotary member, means for rotating said member at a constant speed, said member being provided with sets of equidistant light transmitting slits for producing the different notes, a plurality of sets of apertures of differing forms for the different tones, every aperture in any one set being of the same form and each aperture being associated with a set of slits, a source of light, said light being arranged to be directed through the apertures and the respective sets of slits, shutter means arranged to be operated to permit the passage of light simultaneously through the apertures cooperating with the same set of slits of at least two of said sets of apertures, light sensitive means for receiving the light so transmitted and means associated with said light sensitive means for translating the light falling thereon into sound.

2. A musical instrument comprising in combination a rotary member, means for rotating said member at a constant speed, said member being provided with sets of equidistant light transmitting slits for producing the different notes, a plurality of sets of apertures of differing forms for the different tones, every aperture in any one set being of the same form and each aperture being associated with a set of slits, a source of light, said light being arranged to be directed through the apertures and the respective sets of slits, shutter means arranged to be operated to permit the passage of light simultaneously through the apertures cooperating with the same set of slits of at least two of said sets of apertures, means for collecting the light so transmitted and directing it upon a light sensitive device and means for amplifying and translating into sound the effect of the light on the light sensitive device.

3. A musical instrument comprising in combination a rotary member, means for rotating said member at a constant speed, said member being provided with sets of equidistant light transmitting slits for producing the different notes, a plurality of sets of apertures of differing forms for the different tones, every aperture in any one set being of the same form and each aperture being associated with a set of slits, a source of light, said light being arranged to be directed through the apertures and the respective sets of slits, shutter means arranged to be operated to permit the passage of light simultaneously through the apertures cooperating with the same set of slits of at least two of said sets of apertures, means for selectively operating said shutter means, means for collecting the light so transmitted through the selected apertures and slits and directing it upon a light sensitive device and means for amplifying and translating into sound the effect of the light on the light sensitive device.

4. A musical instrument comprising in combination a rotary member, means for rotating said member at a constant speed, said member being provided with sets of equidistant light transmitting slits for producing the different notes, a plurality of sets of apertures of differing forms for the different tones, every aperture in any one set being of the same form and each aperture being associated with a set of slits, a source of light, said light being arranged to be directed through the apertures and the respective sets of slits, shutter means arranged to be operated to permit the passage of light simultaneously through the apertures cooperating with the same set of slits of at least two of said sets of apertures, means for selectively operating the said shutter means, means for selecting the sets of apertures through which light is to be transmitted, means for collecting the light so transmitted and directing it upon a light sensitive device and means for amplifying and translating into sound the effect of the light on the light sensitive device.

5. A musical instrument comprising in combination a rotary member, means for rotating said member at a constant speed, said member being provided with sets of equidistant light transmitting slits for producing different notes, a plurality of sets of apertures of differing forms for different tones, every aperture in any one set being of the same form, each aperture being associated with a set of slits, a plurality of sources of light arranged in sets, means for rendering operative at least one set of said sources of light, means for selecting at least the operative source of light, means for selecting at least two sets of the apertures, means for collecting light transmitted through the rotary member and for directing it upon at least one light sensitive device, and means for amplifying and translating into sound the effect of the light on the light sensitive device.

6. A musical instrument comprising in combination a rotary member, means for rotating said member at a constant speed, said member being provided with sets of equidistant light transmitting slits for producing the different notes, a plurality of sets of apertures of differing form for the different tones, every aperture in any one set being of the same form and each aperture being associated with a set of slits, sources of light associated with each set of apertures and arranged to be directed through the apertures of the respective sets of slits, shutter means arranged to be operated to permit the passage of light simultaneously through at least two apertures cooperating with the same set of slits, means for selectively operating said shutter means, means for selecting at least two sets of apertures, a light sensitive device, means for collecting light transmitted through the apertures and slits and directing it upon said light sensitive device and means for amplifying and translating into sound the effect of the light on said light sensitive device.

7. A musical instrument comprising in combination a rotary member having a plurality of sets of equidistant light transmitting slits arranged for circumferential rotation about the axis of said member, a plurality of relatively fixed sets of apertures arranged for cooperation with and extending transversely of the direction of rotation of said slits, there being an aperture in each set for cooperation with each set of slits, the apertures in any one set being of the same form but differing from the apertures of other sets, means for directing light upon a selected row of slits through the corresponding apertures of selected sets of apertures and light sensitive means for receiving the light so transmitted and controlling its translation into sound.

8. A musical instrument comprising in combination a rotary member having a plurality of sets of equidistant light transmitting slits arranged for circumferential rotation about the axis of said member, a plurality of relatively fixed sets of apertures arranged for cooperation with and extending transversely of the direction of rotation of said slits, there being an aperture in each set for cooperation with each set of slits, the apertures in any one set being of the same form but differing from the apertures of other sets, means for the transmission of light through the slits and apertures controllable valves for determining the passage of the light through selected sets of slits and the corresponding apertures and light sensitive means for receiving the light so transmitted and controlling its translation into sound.

9. A musical instrument comprising in combination a rotary member having a plurality of sets of equidistant light transmitting slits arranged for circumferential rotation about the axis of said member, a plurality of relatively fixed sets of apertures arranged for cooperation with and extending transversely of the direction of rotation of said slits, there being an aperture in each set for cooperation with each set of slits, the apertures in any one set being of the same form but differing from the apertures of other sets, lighting means associated with the respective sets of apertures, valve means for determining the transmission of the light through selected sets of slits and the corresponding apertures, means for selecting the set of apertures for cooperation with the selected sets of slits and means for receiving the light transmitted and controlling the translation thereof into sound.

GORDON THOMAS WINCH.